April 9, 1946. G. R. ERICSON Re. 22,742

CARBURETOR

Original Filed Nov. 6 1931 9 Sheets-Sheet 1

GEORGE R. ERICSON
INVENTOR

BY F. H. Gibbs

ATTORNEY

April 9, 1946. G. R. ERICSON Re. 22,742
CARBURETOR
Original Filed Nov. 6 1931 9 Sheets-Sheet 2
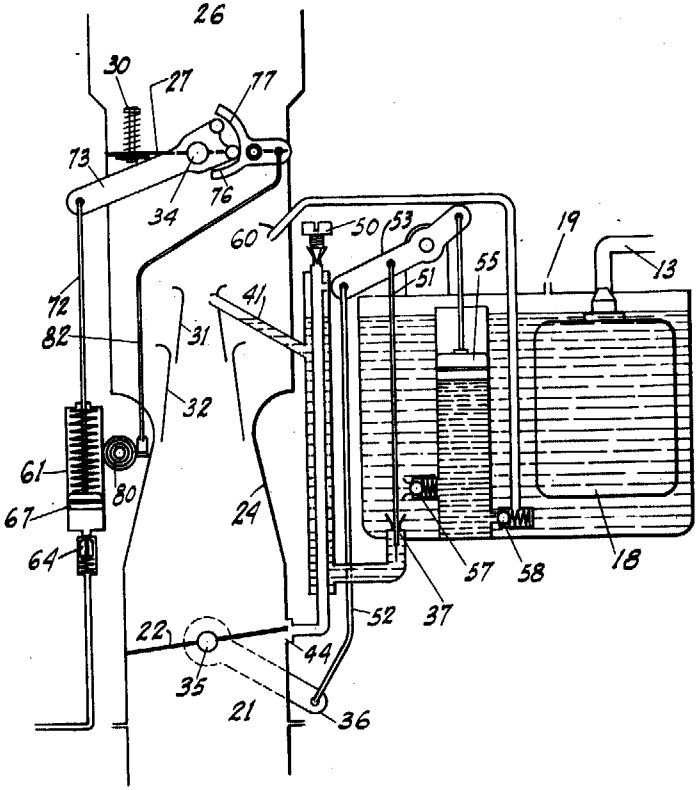
Fig. 1-A
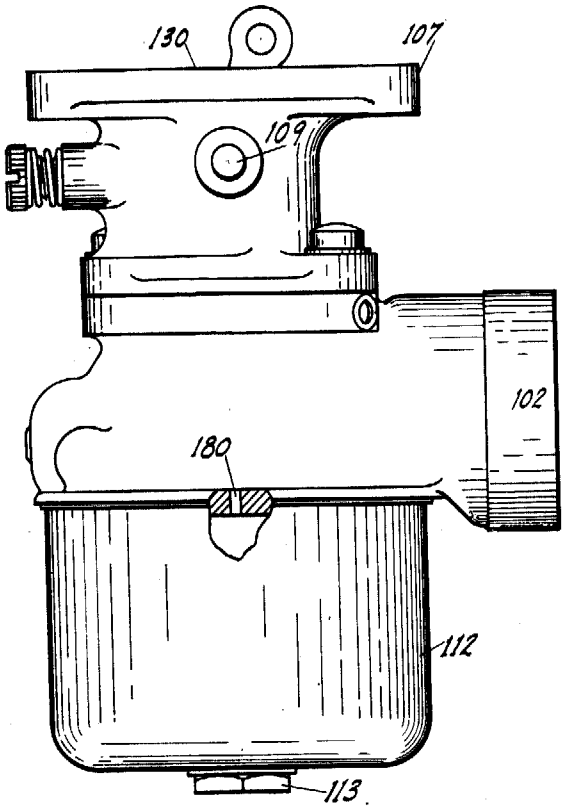
Fig. 10-A
GEORGE R. ERICSON
INVENTOR
BY J. H. Gibbs
ATTORNEY April 9, 1946. G. R. ERICSON Re. 22,742

CARBURETOR

Original Filed Nov. 6 1931 9 Sheets-Sheet 3

GEORGE R. ERICSON
INVENTOR

BY F. H. Gibbs

ATTORNEY

CARBURETOR

Original Filed Nov. 6 1931 9 Sheets-Sheet 4

GEORGE R. ERICSON
INVENTOR
BY J. H. Gibbs
ATTORNEY

April 9, 1946. G. R. ERICSON Re. 22,742

CARBURETOR

Original Filed Nov. 6 1931 9 Sheets-Sheet 5

GEORGE R. ERICSON
INVENTOR

BY F. H. Gibbs
ATTORNEY

CARBURETOR

Original Filed Nov. 6 1931 9 Sheets-Sheet 6

GEORGE R. ERICSON
INVENTOR

BY F. H. Gibbs
ATTORNEY

CARBURETOR

Original Filed Nov. 6 1931 9 Sheets-Sheet 7

GEORGE R. ERICSON
INVENTOR
BY J. H. Gibbs
ATTORNEY

April 9, 1946. G. R. ERICSON Re. 22,742

CARBURETOR

Original Filed Nov. 6 1931 9 Sheets-Sheet 8

GEORGE R. ERICSON
INVENTOR

BY F. H. Gibbs

ATTORNEY

CARBURETOR

Original Filed Nov. 6 1931 9 Sheets-Sheet 9

INVENTOR
GEORGE R. ERICSON
BY F. H. Gibbs
ATTORNEY

UNITED STATES PATENT OFFICE 22,742

CARBURETOR

George R. Ericson, Kirkwood, Mo., assignor to Carter Carburetor Corporation, St. Louis, Mo., a corporation of Delaware Original No. 1,915,851, dated June 27, 1933, Serial No. 573,418, November 6, 1931. Application for reissue December 30, 1940, Serial No. 372,428

14 Claims. (Cl. 261—39)

This invention relates to carburetors for internal combustion engines and more particularly to thermostatic controlling devices for such carburetors. This application is a continuation in part of my co-pending application, Serial No. 446,899, filed April 24, 1930, for improvements in carburetors.

It is an object of the invention to provide a simple and easily manufactured thermostatic controlling device for varying the mixture ratio of fuel and air in accordance with the temperature.

It is a further object of the invention to produce a device of the above described character which, once adjusted, will remain constant over any period of operation.

It is a further object of this invention to produce a device for controlling the mixture ratio of fuel and air in accordance with the suction produced by the motor.

Further objects will appear from the following description and accompanying drawings.

Referring to the drawings:

Figure 1A is a diagram of the carburetor shown in Figure 1.

Figure 10A is a side elevation of the device shown in Figure 10.

Figure 9:
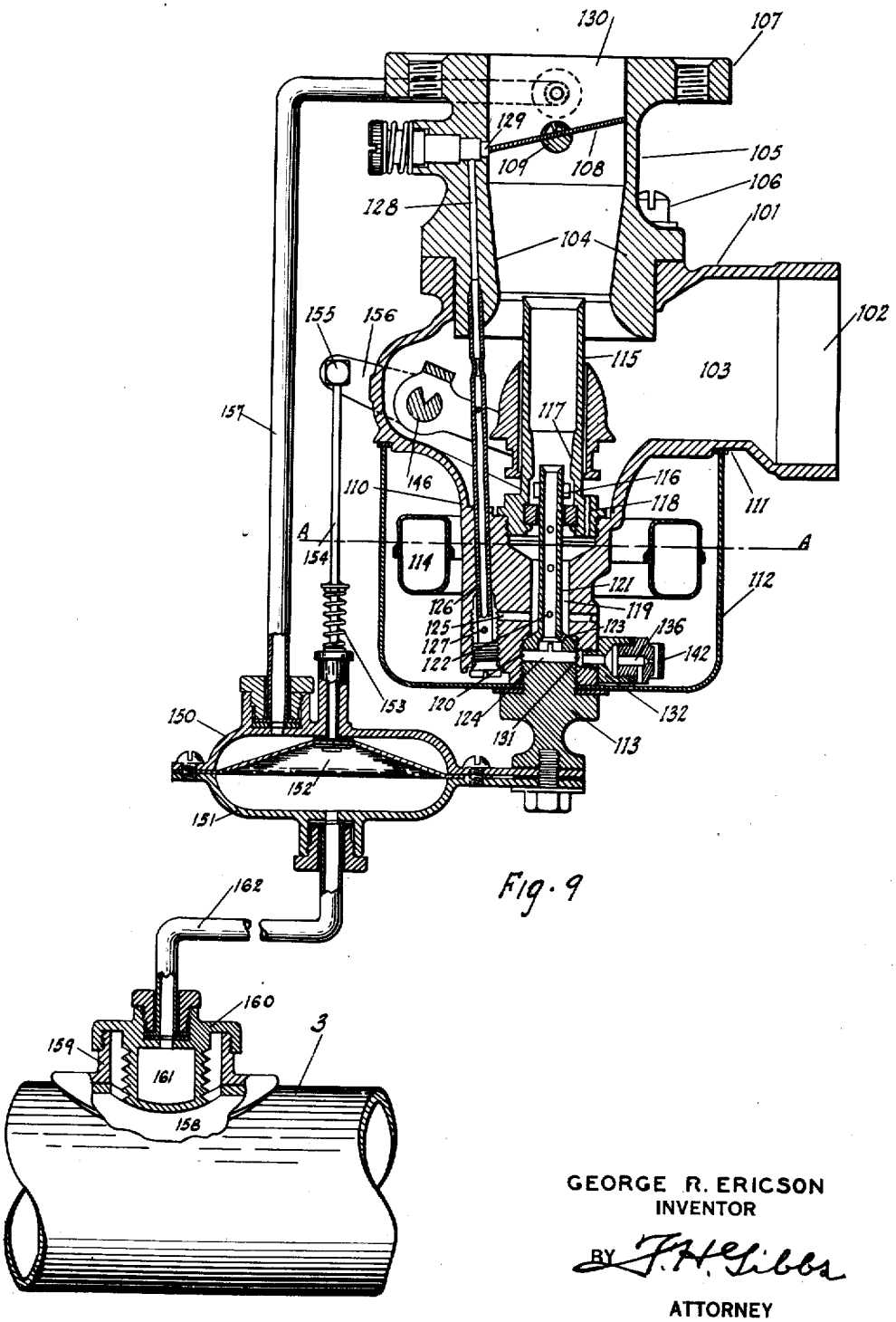
Figure 9 is a somewhat diagrammatic sectional elevation showing a further modification of the invention.
Figure 10:
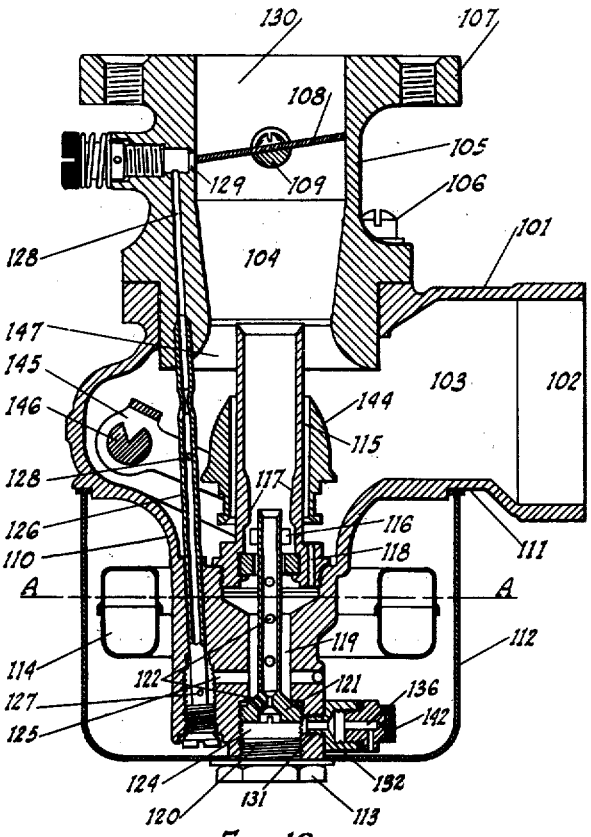
Figure 10 is a sectional elevation showing the invention in a further modified form.

Referring to the drawings, the reference numeral 1 indicates an internal combustion engine having an intake manifold 2, and exhaust manifold 3. The engine is provided with the usual starting device 4, and storage battery 5 for operating the starting device, fuel tank 6, engine driven fuel pump 7, and connection 8 leading from the fuel tank to the fuel pump. The intake manifold 2 may have a conventional hot spot 9 for heating the mixture delivered by the carburetor. The carburetor 10 may be either of the updraft type, as shown in Figures 9 and 10, or of the downdraft type; as indicated in Figures 1 to 8.

Figure 5:
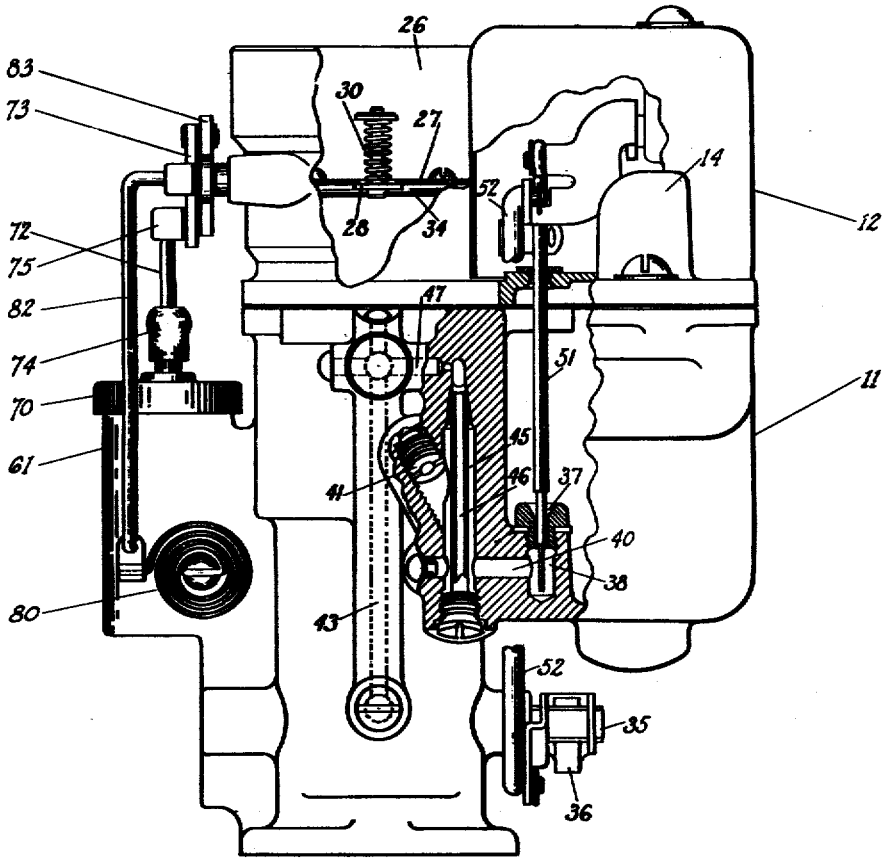
Figure 5 shows a front end elevation of the carburetor shown in Figures 1 to 3, with parts in section and others broken away.
Figure 6:
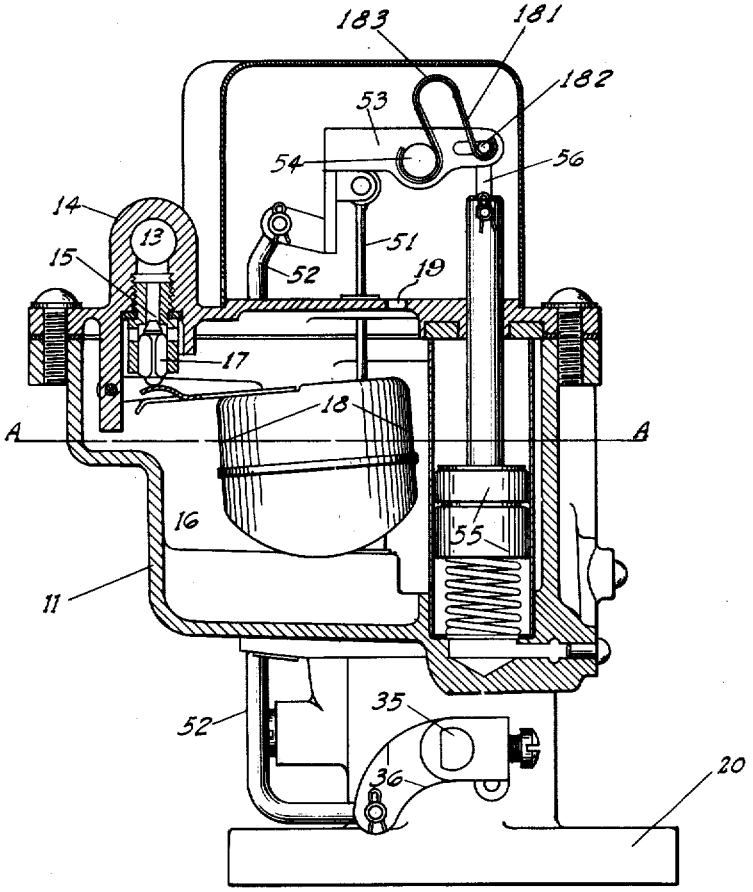
Figure 6 is a sectional elevation of the carburetor shown in Figures 2 and 5 taken along the line 6—6 of Figure 2.
Figure 7:
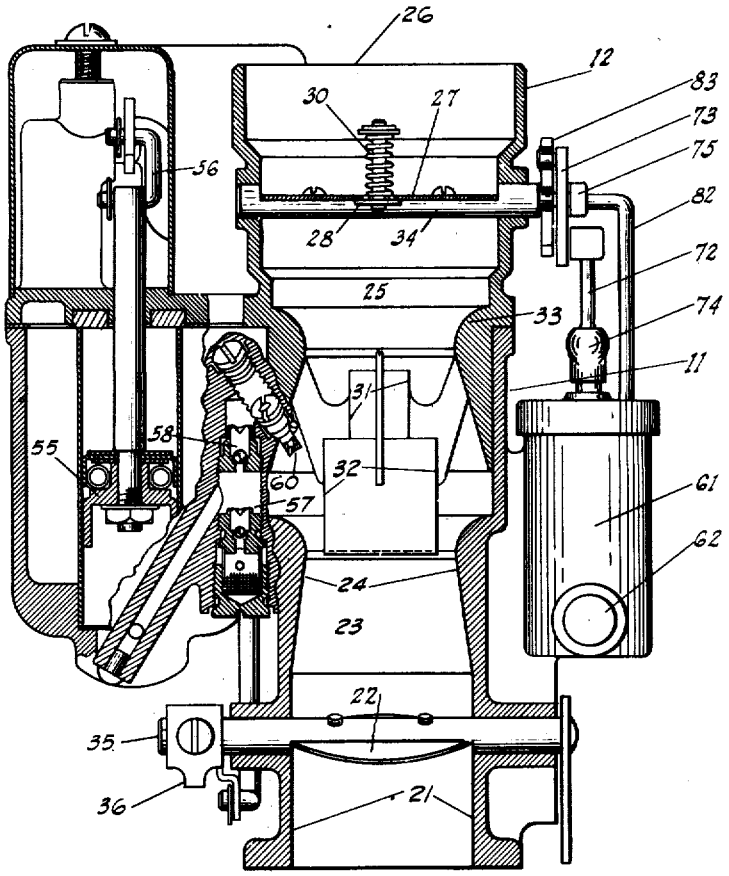
Figure 7 is a front elevation of the carburetor shown in Figures 1 to 6, with parts broken away and others shown in section.

Referring to Figures 2, 3, 5, 6, and 7, the reference numeral 11 indicates a casting forming the main body member of the carburetor, and 12 is a second casting forming the top half or inlet end thereof. The carburetor is supplied with fuel from the fuel pump 7 through conduit 13 which is attached to the inlet boss 14 on the upper half of the carburetor, as indicated in Figure 6. Fuel is admitted to the carburetor through the needle seat 15 and is maintained at a constant level A—A in the float chamber 16 by means of needle valve 17 which is controlled by float 18. A conventional vent is provided for the float chamber as indicated at 19.

The carburetor is mounted on the intake manifold by means of flange 20 at the lower end of the carburetor, and a mixture passage 21 is formed in the castings 11 and 12. This mixture passage may be said to comprise a discharge outlet at the lower end of the passageway controlled by the throttle valve 22, a main mixing chamber 23 just anterior to the throttle valve and below the throat of the main venturi, an air chamber 25 and air inlet 26, the flow of air from the air inlet to the air chamber being controlled by a choke valve 27. The choke valve 27 may be provided with a suction operated relief valve 28 normally held in closed position by a spring 30 for suddenly admitting a small amount of air when the motor starts to run with the choke valve in full closed position. The mixing conduit is provided with a primary venturi 31 and a secondary venturi 32, the primary venturi discharging near the most restricted portion of the second venturi, and secondary venturi discharging near the most restricted portion of the main venturi.

For the purpose of securing higher suctions on the primary venturi at low speeds without substantially restricting the high speed capacity of the carburetor, a venturi 33 may be provided at a point anterior to the main venturi 24, so that the air stream flowing into the carburetor will be increased in velocity at the inlet of the primary venturi.

The choke valve 27 is mounted on a rotatable shaft 34 which is operated in a manner hereinafter to be described. The throttle valve 22 is mounted on a shaft 35 which is provided with a connection 36, so that it may be operated by hand in any suitable manner. It will be understood that the usual hand and foot controls within reach of the driver will be used.

Fuel is supplied from the float chamber 6 to the main mixing conduit through the main metering jet 37, through passages 38—40, and main nozzle 41. The main nozzle is disposed at an angle extending upwardly to the primary venturi 31 in the manner shown in Patent #1,858,615, granted May 17, 1932, to G. M. Bicknell. The nozzle terminates in a recess in the wall of the primary venturi in registration with the discharge opening 42 thereof. This discharge opening is formed in a boss which is cast integral with the venturi, so that absolute accuracy in the location of the tip of the discharge nozzle is obtained. It will be understood that due to the high speed of air flowing through the primary venturi, the main nozzle is quite sensitive as to location and shape. By forming the nozzle discharge tip 42 in a die casting integral with primary venturi 31 absolute accuracy is attainable in quantity production.

It will be understood that the main nozzle 41 takes care of the medium and high speed range of the carburetor. In order to take care of the low speed range, an idling conduit 43 is formed in the wall of the casting 11 and provided with one or more discharge ports 44 discharging adjacent the edge of the throttle valve. It will be understood that this port, if formed as a single opening, will have one portion of its discharge outlet posterior to the throttle when the throttle is in its closed position, and another part anterior to the throttle when it is in the closed position. The construction and arrangement of this port is covered in the patent to W. C. Carter #1,207,134.

If desired, the two portions of the port 44 may be formed as separate openings, one anterior to the throttle and one posterior when the throttle is in its closed position. The idle tube 43 is supplied with fuel from the passage 40 by means of the upwardly conducted tube 45 having an opening 46 therein, the tube 45 being connected to tube 43 by means of the cross passage 47. This cross passage is formed just above the fuel level in the carburetor and prevents siphoning. An air admission port 48 controlled by adjusting screw 50 is provided. The adjustable admission of air at this point serves to control the richness or leanness of the idle mixture.

A metering rod 51 provided with a plurality of steps of different sizes, as indicated in Figure 5, is provided for controlling the effective area of jet 37. This metering rod is connected with the throttle shaft 35 by means of the member 36, link 52, and rocker arm 53. The rocker arm 53 is mounted on a rocker shaft 54 which is pivotally mounted to the upper half of the carburetor. An accelerating pump 55 in connected by means of link 56 to the rocker 53, so that additional charges of fuel will be supplied upon opening movements of the throttle. These additional charges are drawn from the float chamber 6 through check valve 57 during closing movements of the throttle and discharged through check valve 58 and the nozzle 60 during opening movements of the throttle.

Figure 1:
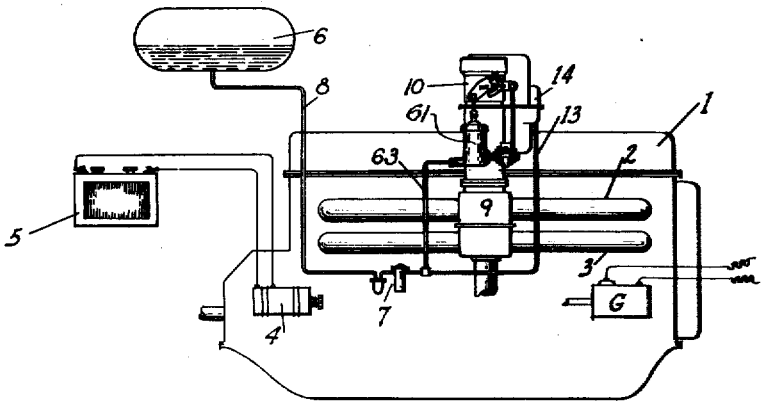
Figure 1 shows a diagram of a carburetor according to my invention applied to an internal combustion engine.

For controlling the richness of the mixture in accordance with the temperature and operating condition of the motor, a cylinder 61 having an inlet 62 for operating fluid is provided. The operating fluid is supplied from a pump which is operated by the engine. This pump may be specially provided for the purpose, but in this case I use the fuel pump 7 and connect it to the inlet 62 by means of conduit 63, as indicated in Figure 1.

A check valve 64 having a small orifice 65 therein is held in place in the inlet by a spring 66, so that the fluid will be admitted to the cylinder 61 at a slow rate, but permitting it to be discharged much more rapidly. A piston 67 provided with the usual packing is mounted in cylinder 61, and a spring 68 held in position by the combination cover and guide member 70 is provided for normally holding the piston 67 in its downward position. The piston 67 is provided with a piston rod 71 slidably mounted in the cover 70 and connected by means of link 72 and operating arm 73 to the choke shaft 34.

The connection is made by means of suitable ball and socket or pivot joints 74 and 75. The arm 73 is so mounted on shaft 34 as to close the choke when the piston 67 is in its downward position, and the choke valve will be opened by an upward movement of the piston 67. The motion of the arm 73 is controlled by a double cam comprising segments 76 and 77 formed in a single piece and pivotally mounted to the upper half of the carburetor at 78.

The cam is controlled by a thermostat or heat responsive element 80. This heat responsive element may be of any type, but I have shown in Figures 1 to 3 a coil of the conventional bimetallic form mounted on a fixed pivot 81 and having its outer end connected by means of link 82 to the operating arm 83 of the double cam member.

The choke operating arm 73 is provided with a pair of rollers 84 for contacting with the cam surfaces 76 and 77, so that the opening and closing movements of the choke will be limited by the cams.

Figure 4:
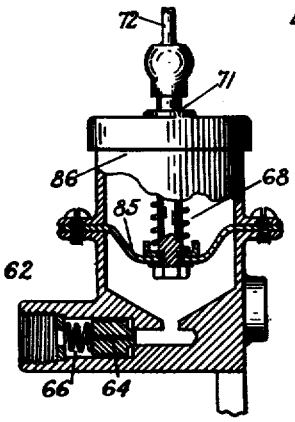
Figure 4 shows a modified form of operating cylinder for use in connection with the carburetor shown in Figures 1 to 3.

In Figure 4, I have shown a modified form of operating cylinder to replace the cylinder 6 and its associated parts. The difference is chiefly in the use of a diaphragm 85 in place of the plunger 67 and the change in form of the cylinder to provide a diaphragm housing 86.

The operation of the device shown in Figures 1 to 7 is as follows:

When the motor is not running and when the temperature is low, the thermostat 80 contracts in an anti-clockwise direction with reference to Figure 5, drawing the member 83 downwardly and removing the cam 77 from the path of the rollers 84 in accordance with the degree to which the temperature is lowered. If the temperature is lowered to a sufficient extent, the cam 77 will permit rotation of the operating arm 73 in an anti-clockwise direction with reference to Figure 3, so as to fully close the choke valve 27. This movement is caused by the spring 68.

When the engine is started under such conditions the fuel pump produces a substantial pressure amounting to approximately three or four pounds per square inch on the lower side of the piston 67. This pressure, however, is not produced at the cranking speeds of 30 to 100 R. P. M., because the choke valve is in closed position and the suction on the nozzle 42 and port 44 is high enough to withdraw fuel at a very rapid rate. For that reason, the fuel pump is prevented from building up its normal pressure.

When the engine starts to run under its own power, the rate of fuel delivered by the fuel pump is increased, and the resulting pressure also increases to a point at which the piston 67 or diaphragm 85 may be operated. The piston or diaphragm then begins a gradual opening movement of the choke valve.

At the first fire of the engine, the suction is increased from approximately ¼ pound per square inch to several pounds per square inch, and the relief valve 28 is opened, thereby admitting sufficient air to operate the engine at several hundred R. P. M. in spite of the resistance of the cold oil on the cylinder walls.

Figure 2:
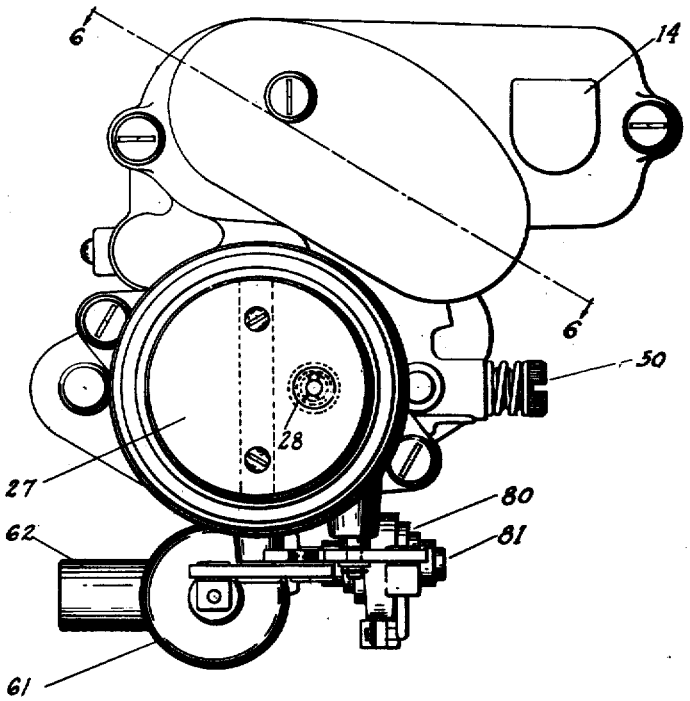
Figure 2 is a plan view of a larger scale of the carburetor shown in Figure 1.
Figure 3:
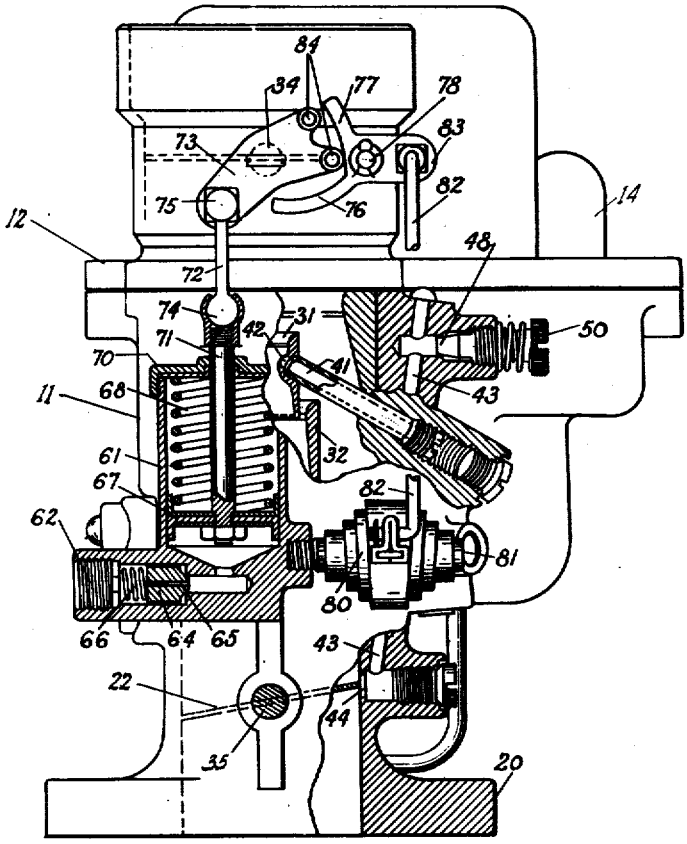
Figure 3 shows a side elevation of the carburetor shown in Figures 1 and 2, with parts in section and others broken away.

While the thermostat 81 has been shown as being mounted on a part of the carburetor, it will be understood that the thermostat is intended to be exposed to at least some degree of heat, and this thermostat may if desired be mounted on the exhaust pipe or on the hot spot of the inlet manifold as indicated in Figure 9. Where the carburetor itself is sufficiently heated, I prefer to mount the thermostat as shown in Figures 2, 3, and 5, but the location of the thermostat will be selected according to the heat characteristics of each particular type of installation, and artificial heat may be provided if necessary.

As the engine continues in operation, the piston 67 will be raised until the roller 84 contacts with the cam 76, so that the choke valve 27 will be brought to a position in which it will admit some air almost immediately when the motor starts to run, but the amount of air admitted will be varied in accordance with the operating temperature. As the thermostat 80 warms up, the cam 76 will be moved downwardly, and the pump pressure will cause the piston 67 to rise and open the choke valve as fast as such opening is permitted by cam 76. When the engine reaches normal operating temperature, the limit of movement of the choke valve will be reached, and the valve will remain in that position as long as the engine is running.

Figure 17:
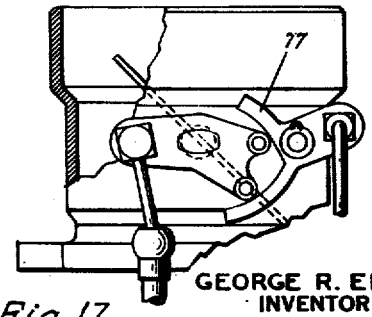
Figure 17 shows the choke valve in partially open position and prevented from further closing by the cam 77, the thermostat being in the hot position.

When the engine is stopped, the fuel in conduit 63 will no longer be under pressure, and the spring 68 will return the piston 67 toward the lower end of its stroke, thereby closing the choke valve 27. If the engine is hot, however, the choke valve will not be permitted to return to its full closed position. The upper one of the rollers 84 starting from the position shown in Figure 17 will contact with the cam 77, and further movement thereof will be arrested. As the engine cools off, the thermostat 80 will withdraw the cam 77 from the path of the rollers 84 and permit the gradual closing of the choke valve in accordance with the degree to which the engine has cooled off, so that the starting and warming up operation may be repeated as hereinbefore described.

It should be understood that I may, in some installations, provide a substantial amount of lost motion between the rollers 84 and the cams 76 and 77. This lost motion will amount to 20 or 30 degrees in movement of the choke valve 27, and the purpose is as follows: It ordinarily requires a richer mixture to start an engine than to keep it running, and the cranking speed is considerably below the operating speed. The low cranking speed does not pull over as much fuel in comparison with the amount of air as would be pulled over at a higher speed. For that reason, it is desirable to have a slight restriction of the air inlet under starting conditions and to eliminate that restriction as soon as the engine starts, provided lost motion between the rollers 84 and the cams 76 and 77 accomplishes that object in a very convenient manner.

Figure 8:
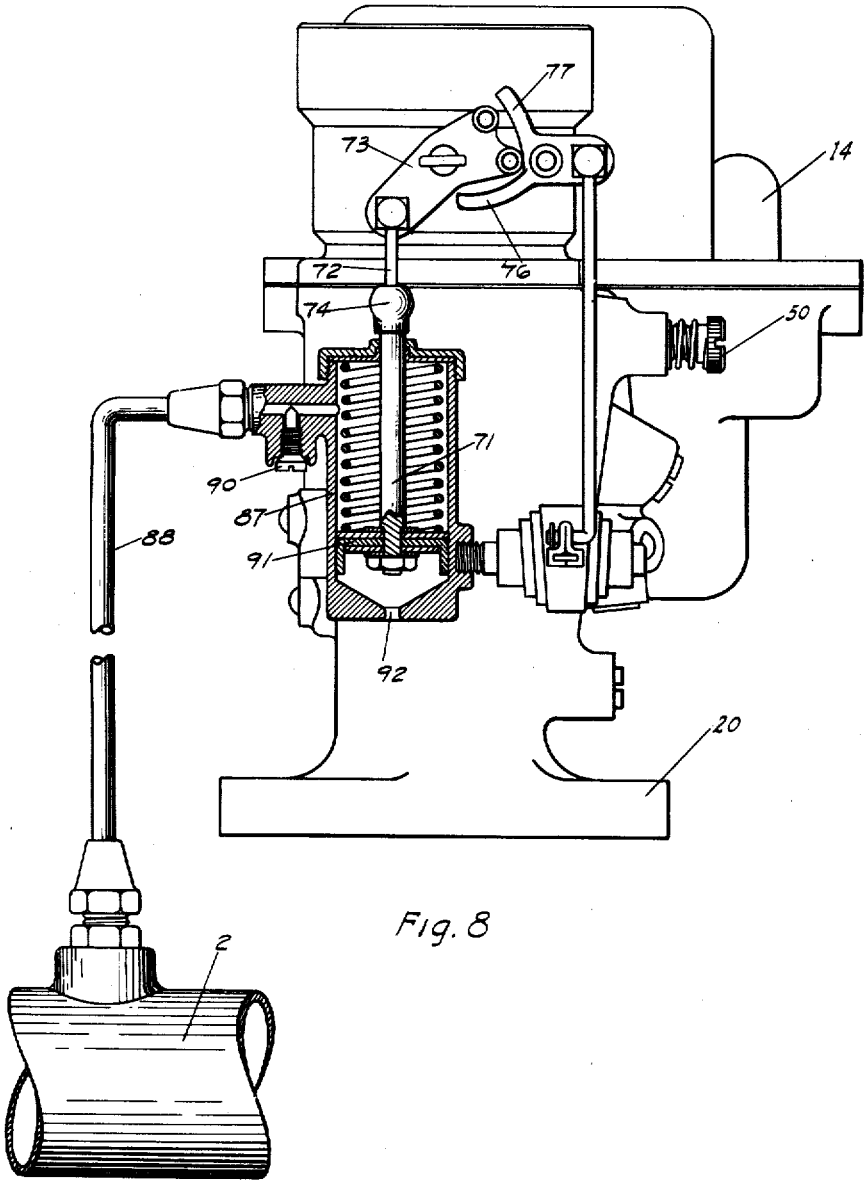
Figure 8 is a somewhat diagrammatic elevation of a modified construction.

A third form of my invention is shown in Figure 8. In this embodiment, the operating cylinder 87 is operated by the suction developed in the intake manifold of the engine. The intake manifold is indicated in Figure 8 by the reference numeral 2 and is connected with the upper end of cylinder 87 by conduit 88 which is controlled by a regulating screw 90. The piston 91 is, of course, modified so that it will be operated by suction, but it should be noted that either a piston provided with a leather packing or a solid metal piston with no packing may be used. The leaking in the solid metal type is not of great importance, as a substantial amount of air may ordinarily be admitted to the intake manifold without upsetting the mixture ratio. An inlet opening 92 is provided at the lower end of cylinder 87, so that the lower side of the plunger will be exposed to atmosphere. The remaining parts of the carburetor are the same as shown in Figures 1 to 7.

The operation of the device shown in Figure 8 is the same in principle as that of the device shown in the preceding figures, except that the increased suction produced by the engine beginning to operate under its own power provides the force for opening the choke valve. In both movements, however, the motive force is derived from a fluid pressure which is set up by the operation of the engine when it is running under its own power.

A further embodiment of the invention is shown in Figure 9. In this figure, the carburetor is of the updraft type and the reference numeral 101 indicated a main body casting having an air horn or air inlet 102 therein. This air horn leads into an air chamber 103 which discharges through a venturi 104 formed in a second body member 105 which is attached to the first body member by suitable screws 106, the body member 105 is provided with a flange 107 by means of which it is attached to the inlet manifold of an internal combustion engine in the usual manner.

A throttle valve 108 mounted on a suitable shaft 109 is provided for controlling the outlet of the carburetor. The body member 101 is provided with a downward extension 110 surrounded by an annular seat 111, a cup-shaped bowl 112 is seated at its rim on the annular seat 111 and retained in position by a nut 113 which is threaded into the lower end of the extension 110.

Fuel is supplied to the bowl by any suitable means, such as an engine driven pump or a vacuum tank, and it is maintained in the bowl at substantially the level A—A by a conventional float mechanism 114. A conventional bowl vent 180 is provided, as indicated in Figure 10A. The inlet connection and the float valve are not shown, these being so well known in the art that no further description is necessary.

A standpipe 115 is threaded into the lower portion of the air chamber as shown. Ports 116 are provided in the lower portion of the standpipe to receive air from the air chamber 113. A restricted throat 117 if formed in the standpipe above the entrance of the air inlet for the purpose of increasing the air speed at the point to insure thorough vaporization of the fuel. An air bleed 118 is drilled in the lower portion of the standpipe and communicates with the well 119 formed in the extension 110 of the body member 101. The well 119 is provided with screw threads 120 at its lower portion to receive the corresponding threads of the nut 113 and also to receive the threads of a nozzle 121 which is mounted concentrically with the well 119 extending from the lower portion of this well to the restricted portion 117 of the standpipe.

Accelerating holes 122 are provided for the nozzle and form a communication between the well 119 and the anterior of the nozzle. Fuel is supplied to the well 119 and to the interior of the nozzle through suitable passages 122 and 123, respectively, which form communication between the well and nozzle and the space between the nozzle and the end of the nut 113, as indicated at 124.

A cross connection 125 supplies fuel to the lower end of the idling tube 126 and the fuel enters this tube through the small port 127, as shown. Conventional air bleeds 128 are provided in the idle tube above the fuel level, and the upper end of the tube is connected to a bore 129 in the body member 105. From this bore the fuel passes to an outlet port 129 in the side of the outlet passageway 130 of the carburetor. This port is formed at the point where the throttle valve closes against the side of the passageway, and when the throttle is slightly open, as it is when adjusted for proper idling, at least a portion of the port 129 is in communication with the mixing conduit at a point posterior to the throttle. In this manner a suction connection from a point posterior to the throttle is provided for admitting the idling fuel and for affecting the valve.

When the engine is operating under its own power but at low speeds, for instance, with the throttle one-eighth open, the port 129 would be fully exposed to the suction above the throttle and that suction will be very high, perhaps corresponding to 7 or 8 pounds per square inch. Excellent vaporization of the gasoline is accordingly obtained, and it is therefore desirable to lean out the mixture to a certain extent. The suction connection comprising port 129, passages 128, 133, and 136 transmit the suction from above the throttle to the valve 142 causing it to close or partly close, and thereby lean out the mixture.

A transverse threaded bore 131 is formed in the extension 110 near the lower end of the carburetor, and a body member 132 is threaded into this bore. Body member 132 comprises a large passageway 133 calibrated to meter the maximum quantity of fuel, which it is desired to pass through the carburetor under low temperature conditions, opening into a threaded bore 134 which receives he screw threaded ends of a second body member 135 having a longitudinal bore 136 of comparatively large diameter, so that it does not form a restriction or calibration, and a small calibrated longitudinal bore 137 of considerably smaller diameter than the bore 136, a transverse bore 138 of larger diameter than the bore 137 is drilled in the body member 135 and provides the main communication between the bore 136 and the fuel in the bowl.

A bracket 139 having a perforation 140 is attached to the two body members by screwing them together, the perforation 140 surrounding the threaded end of the body member 135. The bracket is bent into a U shape at the end opposite the perforation 140 to provide a parallel short leg 141 to which may be attached the thermally operated controlling member 142. This control member is formed of a straight flat piece of the usual bimetallic thermostatic material, the more expansible metal being placed on the outside, and the less expansible metal being placed next to the end of the body member 135. The member 142 is held in place by any suitable means, such as a rivet 143. It will be understood that the member 135 may be inserted or withdrawn from the U-shaped bracket by swinging the member 142 on the pivot 143. When the member 142 is swung aside, the member 135 may also be readily engaged by a wrench.

The passageway 138 is so calibrated that when the temperature is reasonably high say, above 70 degrees Fahrenheit, in the fuel bowl of the carburetor, the combined resistance offered by the passageways 122, 123, and 138 regulate the flow of fuel to give a proper mixture for operating under high temperature conditions. It will be understood that the control member 142 moves to the left of the Figure 3 and closes when the temperature is in excess of approximately 70 degrees Fahrenheit, thereby closing the opening 137 and causing all the fuel for the carburetor to flow through the passageway 138. When the temperature falls below 70 degrees Fahrenheit in the fuel bowl, the member 142 moves to the right, opening the passageway 137, thereby enriching the fuel mixture by the capacity of the passage 137 which is approximately one-eighth of that of the passage 138. The fuel is then metered at the passage 133 and at the passages 122 and 123.

A feature of this invention is that the thermostatic metal is made comparatively short, but very thin, and flexible by mechanical force as well as by changes in temperature, and this has a very important object in this invention, in addition to securing the great cheapness and simplicity of construction which are also obtainable with this device.

In cold weather, when the automobile to which the carburetor is attached is operated continuously at low speed, the fuel in the carburetor bowl will reach a temperature of approximately 70 degrees or more without very great delay; for instance, when the outside temperature is zero, the carburetor bowl will probably attain a temperature of 70 degrees within about three to five miles, but if the car is driven at high speed, for instance, in excess of 40 miles an hour, the rate of fuel flowing into the bowl is so rapid that the temperature existing in the bowl is likely to approach that existing in the fuel tank and not that of the engine. The fuel tank is ordinarily mounted at the rear end of the car and is very likely to be cold, and the rate of heat conduction down through the body of the carburetor being substantially constant, a rapid lowering of the temperature in the bowl is experienced, with the result that one would expect the thermostat to open up and give an undesirably rich mixture while driving the car at high speed in cold weather. This difficulty is overcome in my device by the following construction:

The thermally controlled element 142 is made very thin, say, in the order of .017 of an inch in total thickness of the two metals, and the length and width and thickness are so selected with respect to the suction of the carburetor that the suction at the end of the bore 137 at speeds above 40 miles an hour will bend the member 142 into contact with the face of the member 135, closing the bore 137. It will be understood that greater thicknesses of thermostat metal could be used with greater length, or less width, or greater areas exposed to suction, etc.

By reason of the fact that at speeds of 40 miles an hour or more, the fuel is thoroughly vaporized by the comparatively high air speed, it is unnecessary at such speeds to supply additional fuel even if the temperature is low. This condition is also partly due to the fact that the temperature in the bowl at speeds of 40 miles an hour or more is likely to be much lower than that of the engine itself.

A choke cone 144 is slidably mounted on the standpipe 115 and is operable by a yoke 145 mounted on an arm 146 for the purpose of restricting or cutting off the annular passage 147 between the upper end of the standpipe 115 and the throat of the venturi 104. This arrangement is used for starting or for extreme cold weather conditions, as desired.

The valve or choke cone 144 corresponds to the choke valve 27 in the preceding modifications. The shaft 146 also corresponds to the choke shaft 34 in the preceding modifications, and the same operating devices for operating choke valve 144 in accordance with the temperature and suction of the engine may be provided. The fuel pump pressure may also be used to control the choke valve 144.

In the embodiment shown in Figure 9, the heat and suction for operating the choke valve are applied as follows: A diaphragm housing comprising an upper half 150 and a lower half 151 is mounted on the lower part of the carburetor, as indicated. The diaphragm 152 normally held in its lower position by spring 153 is mounted in the housing and connected by shaft 154, link 155, and arm 156 to the choke shaft 146. The upper half 150 of the housing is connected by means of the conduit 157 to a point in the discharge outlet 130 of the carburetor.

The exhaust pipe 3 is provided with an opening 158 surrounded by boss 159 to which is attached a member 160 having a chamber 161 therein to contain a vaporizable fluid such as ether or the like. This chamber is of comparatively small capacity and is connected by means of conduit 162 to the lower half of housing 151. The amount of ether in chamber 161 is comparatively small and is quickly vaporized upon the starting of the engine and the resultant heating of the exhaust pipe 3. The liquid used in chamber 161 is preferably so selected that it may be at least partially condensed at the temperatures to which the chamber 151 is subjected and at pressures below 100 pounds per square inch, so that excessive strains on the diaphragm and leakage may be avoided.

The operation of the device shown in Figure 9 is as follows:

The carburetor being attached by means of flange 107 to an internal combustion engine, air enters the air inlet 102 and flows through port 116 in the base of the standpipe up past the nozzle and through the restriction 117 in the standpipe and into the main venturi or mixing chamber 104. Air from the inlet 102 also passes through the air chamber 103 and flows through the annular space 147 around the top of the standpipe. Fuel being supplied to the bowl and maintained at a constant level A—A, the suction caused by the operation of the engine draws fuel into the passageway 138 through the bores 136, 133, 122, and 123 into the nozzle and the accelerating well 119.

Air from the air chamber flows down through the air bleed 108 and mixes with the fuel in the nozzle and the accelerating well, passing up through the discharge outlet of the nozzle into the primary mixing chamber 148 above the restriction 117 in the standpipe.

When the carburetor is operated under high temperature conditions, for instance, about 70 degrees Fahrenheit, the thermally controlled element 142 will be bent to the left to close the end of the passage 137 so that all the fuel must pass through the passageway 138, thereby providing a mixture which is calibrated for high temperature operation.

When the temperature is low, as when starting up on a cold morning, the thermally controlled element 142 is bent to the right as shown in Figures 1 and 3 to permit additional fuel to enter the passageway and thereby enrich the mixture in the degree of approximately 12 per cent. When the choke valve 144 is closed and the throttle slightly opened, as for starting at low temperature, the suction is built up at higher than normal for the same operating speed by the fact that the choke valve is closed, preventing the relief of suction by air entering at 147. When the engine is cranked at normal cranking speeds, say, from 40 to 100 R. P. M., the suction developed at such low speeds is not sufficient to close the valve 142 if the temperature is extremely low—for instance, zero Fahrenheit, or below. However, when the engine starts to run under its own power, the suction is substantially built up due to the increase in operating speed of the engine to anywhere from 200 to 400 R. P. M.

The high suction which will now be built up by the engine is communicated to the valve 142 which closes and leans out the mixture, and in this manner a member is provided for leaning out the mixture as soon as the engine starts to run under its own power. When the valve 144 is opened, the suction is again decreased, and if the temperature is low and the speed not above normal, the valve 142 will again be open in response to the lowered suction. It will be noted that the port 129 is posterior to the throttle valve when that valve is slightly open and the port is also posterior to the choke valve 144, so that the suction conveyed to the valve 142 may be responsive to movements of either the throttle or choke valve, and the claims should be construed accordingly.

When the engine reaches normal operating temperature, heat from the engine is conducted down through the body to the carburetor and the extension 110 to the fuel in the bowl, thereby warming the fuel in the bowl and the thermally controlled element 142 which thereupon bends to the left and closes the end of the orifice 137.

When the fuel in the main fuel tank is very cold and the car is operated at high speed, the temperature in the bowl will again fall, due to the rapid rate of flow of the cold fuel into the bowl. This, however, will not cause the thermally controlled element 142 to open the end of the passageway 137, except under extreme cold conditions, because the suction will hold the member 142 in closed position.

During starting, the diaphragm 152 will be in its lower position, thereby closing choke valve 144. However, if the temperature is high, the fluid in chamber 161 will be partially vaporized and the choke will not be permitted to close the full distance. If the choke is fully closed, the concentration of suction upon the fuel jet 137 will cause the valve 142 to close by suction as soon as the engine is cranked, thus restricting the passage 137 and having a tendency to lean out the fuel mixture and permitting the use of higher suctions to assist in vaporizing the cold fuel without danger of overloading the engine with fuel during cranking.

Additional leaning out is desired as soon as the speed of the engine is increased from cranking speed to operating speed, and a relief valve may be mounted in the choke valve 114, said relief valve to correspond to valve 28, shown in Figure 5. The action of such a relief valve will, of course, add to the leaning out effect of the closing by suction of valve 142. It will be understood that the cranking or running speed at which valve 142 will close by suction will depend on the temperature.

When the engine begins to operate under its own power, the suction from above the throttle will be applied to chamber 150 through conduit 157, and the diaphragm 152 will be raised against the pressure of spring 153, thereby causing the choke to be opened. The strength of the spring 153 is so selected that suction in chamber 130 is not alone sufficient to move the choke valve to full open position when the temperature is low, but the normal graduating effect of the spring 153 will cause a stoppage of the operating movement of the diaphragm at a point which will vary in accordance with the suction derived from chamber 130, and the pressure derived from chamber 161, and conduit 162. In this manner, the choke valve will at first partially open, then gradually be fully opened as the engine warms up.

With reference to the device shown in Figures 10 to 13, this carburetor is the same in principle and operation as the device shown in Figure 9, with the exception that the thermo-suction control affects the fuel supply alone, the valve 144 being manually operated, and the thermo-suction control device for shaft 146 is omitted. The construction and operation will be fully understood from the preceding description.

Figure 14:
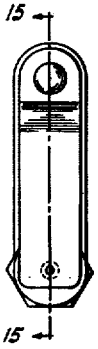
Figure 14 is an end elevation showing a modified form of the thermo-suction valve for use in connection with the construction shown in Figure 10.
Figure 15:
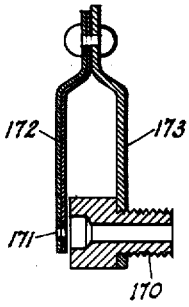
Figure 15 is a sectional view taken along the line 15—15 of Figure 14.
Figure 11:
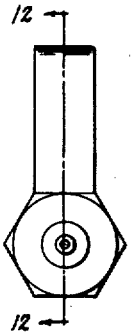
Figure 11 is a detail view showing an end elevation of the thermo-suction valve member used in connection with the device shown in Figure 10.
Figure 12:
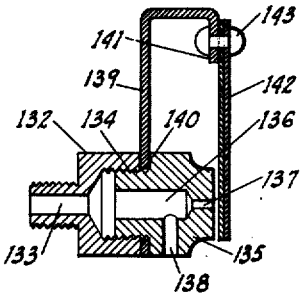
Figure 12 is a sectional view taken along the line 12—12 of Figure 11.
Figure 13:
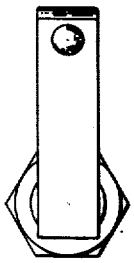
Figure 13 is an end elevation of the device shown in Figure 11 taken from the opposite end.

With reference to the device shown in Figures 14 and 15, the main jet member 170 is used to replace the jet 132—135, as shown in Figure 9. Instead of having an additional orifice 138 for the lean carburetion, I provide orifice 171 in the thermostatic valve 172. Such provision may be formed by a punching operation, and the necessity of drilling the additional pasageway in member 170 is eliminated. A bracket 173 corresponding to bracket 139 is provided for supporting the thermostatic valve.

Figure 16:
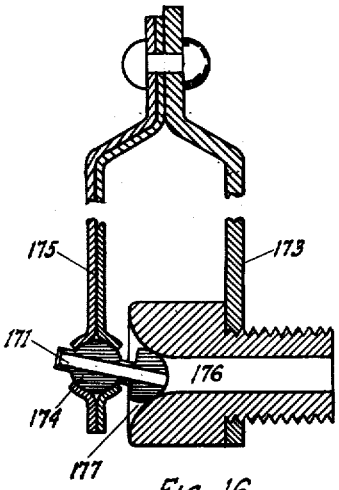
Figure 16 is a sectional view showing a further modification of thermo-suction valve for use in connection with the device shown in Figure 10.

With reference to the device shown in Figure 16, this is a slight improvement on the construction shown in Figures 14 and 15 in that the orifice 171 is carried in a member 174 which is mounted in a ball and socket joint on the thermostatic member 175. At the end of the member 174, a ball-shaped discharge outlet 176 is provided to contact with the re-entrant surface of the jet member 177. The ball and socket joint permits free movement within limitations of the member 174 in the thermostat 175, so that absolute registration of the orifice 171 with the passageway through jet 177 is unimportant.

I have shown in Figure 6 a construction by which the discharge of the accelerating pump may be controlled in accordance with the temperature. This construction embodies a thermostat member 181 pivotally connected to the rock shaft 54 and also to the upper connecting pin 182 of the link 56. This thermostat is of the usual bimetallic form with the same expansible metal on the outside of the loop 183 so as to shorten the operating arm between shaft 54 and pin 182 when the temperature is high. This construction, however, is not claimed in this application, but will be claimed in a division thereof.

I claim:

1. In a plain tube carburetor, means forming a mixing conduit, means forming a constant level fuel chamber, means comprising a fuel conduit for delivering fuel from said constant level chamber to said mixing conduit, a throttle valve controlling the flow of mixture from said carburetor, said fuel conduit comprising an inlet branch and a pair of discharge branches, one of said branches discharging adjacent said throttle valve, and the other discharging anterior to said throttle valve, means comprising an air inlet for admitting air to said mixing conduit, said fuel and air inlets during high temperature and normal operation of the carburetor being of constant size regardless of either temperature or the suction which may be applied to said carburetor, a valve for controlling one of said inlets, and means responsive to both suction and temperature for controlling said valve, stop means for said valve, to limit its movement as the temperature reaches normal, said valve being unaffected by suction after it comes in contact with said stop.

2. In a carburetor, means forming a mixing conduit, means forming a constant level fuel chamber, said mixing conduit having a discharge outlet, a throttle controlling said outlet, a venturi in said conduit anterior to said throttle, a fuel conduit having an inlet branch and two outlet branches, one of said outlet branches discharging near the throat of said venturi, and the other of said outlet branches discharging adjacent said throttle, an air inlet for said mixing chamber, means comprising a plurality of openings located at different levels for admitting corrective air from said air inlet to that branch which discharges near the throat of the venturi, said air inlet and the inlet branch of said fuel conduit being normally open and of constant size regardless of either temperature or suction after the temperature has reached a predetermined minimum, whereby the flow characteristics of said carburetor will be controlled by said throttle and said corrective air, and means for controlling one of said inlets comprising a suction and temperature operated valve, said valve acting to enrich the fuel mixture at subnormal temperature and low suction and also acting either by increased temperature or increased suction or both to lean out the mixture to the normal operating condition thereof.

3. In a carburetor, means forming a mixing conduit, said mixing conduit having a mixture outlet, an air inlet and an air chamber between said inlet and outlet, a manually operable valve between said air chamber and said outlet, means forming a fuel supply conduit, means for admitting air to said fuel conduit from said air chamber, valve means for controlling the richness of the mixture delivered by said carburetor, means responsive to both heat and suction for operating said valve to lean out the mixture at high temperatures and suctions and enrich said mixture at low temperatures and suctions, and a suction connection leading from a point in said mixing conduit posterior to said first-named valve for operating said mixture controlling valve.

4. In a plain tube carburetor, means forming a mixing conduit, said conduit having an air inlet and a mixture outlet, means forming a fuel supply chamber, a branched conduit having a single inlet and a plurality of outlets, said inlet communicating with said fuel chamber to receive fuel therefrom, and said outlets discharging at spaced points in said mixing conduit, a throttle valve in said mixing conduit, said throttle valve being posterior to one of said fuel outlets but adjacent the other of said fuel outlets, a suction operated valve for controlling the flow of fuel to said branched conduit, said valve being mounted in and operated in the closing direction by the suction applied to the liquid fuel.

5. In a carburetor, means forming a mixing conduit, said conduit including an air inlet, a fuel inlet, and a mixture outlet, a manually operated valve for said conduit, a valve for controlling the flow through one of said inlets to enrich or lean out the fuel mixture discharged by said carburetor, a heat responsive device capable of operation independent of suction for operating said valve in accordance with the temperature to lean out the mixture upon an increase of temperature, and means for operating said valve to lean out said mixture upon an increase in suction in the carburetor, said last-named means including a suction conduit connected to a point in the mixing conduit posterior to said manually operated valve, said heat responsive device being constructed and arranged to allow said valve to move to its leanest position when the normal operating temperature is reached or exceeded, and to remain in such position as long as said normal operating temperature is maintained or exceeded regardless of suction.

6. In a carburetor, means forming a mixing conduit, a throttle valve controlling the flow of mixture through said conduit, means forming a constant level fuel supply chamber, a fuel conduit leading from said fuel supply chamber and having a main outlet into said mixing conduit at a point anterior to said throttle, said fuel conduit having a low speed branch, said low speed branch having an outlet in the wall of said mixing conduit, said outlet being located near said throttle valve when it is in closed position, said fuel conduit having an inlet located below the fuel level in said constant level fuel chamber, said mixing conduit having an air inlet, a valve in one of said inlets, and means responsive to both temperature and suction for controlling said valve.

7. In a carburetor, means forming a mixing conduit, a throttle valve controlling the flow of mixture through said conduit means forming a constant level fuel supply chamber, a fuel conduit leading from said fuel supply chamber and having a main outlet into said mixing conduit at a point anterior to said throttle, said fuel conduit having a low speed branch, said low speed branch having an outlet discharging in the wall of said mixing conduit, said outlet being located near the edge of said throttle valve when it is in closed position, said fuel conduit having a fuel inlet and said mixing conduit having an air inlet, valve means for controlling one of said inlets, said valve being operable to vary the proportions of fuel and air delivered by said carburetor, and means responsive to both temperature and suction for operating said valve to mixture enriching position when both the suction and the temperature are low, and for operating said valve in an opposite direction to lean out said mixture when either the temperature or the suction increases.

8. In a plain tube carburetor, means forming a mixing conduit, an air inlet and fuel inlet for said mixing conduit, said air and fuel inlets being of constant size regardless of suction under normal operating conditions, and valve means for controlling at least one of said inlets in accordance with both temperature and suction for starting purposes when the operating temperature is below normal.

9. In a plain tube carburetor, means forming a mixing conduit, air and fuel inlets for said conduit, both of said inlets being of constant size regardless of suction to give a constant fuel mixture ratio during normal operation, valve means for controlling each of said inlets to enrich the fuel mixture ratio under abnormal operating conditions, one of said valves being responsive to suction and being operable by suction to move it to the normal operating position, and one of said valves being operated in response to temperature changes whereby it will be moved to its normal operating position when the temperature reaches normal.

10. In a plain tube carburetor, means forming a mixing conduit, and air inlet and fuel inlet for said mixing conduit, said air and fuel inlets being of constant size regardless of suction and adapted to deliver a constant fuel mixture ratio under normal operating conditions, a valve for controlling one of said inlets to enrich the mixture whenever the temperature is below normal, heat responsive means for operating said valve, said valve being constructed and arranged to be directly acted on by suction, when it is in mixture enriching position, and being displaced by suction in a direction to cause a leaner mixture to be delivered by the carburetor.

11. In a plain tube carburetor, means forming a mixing conduit, air and fuel inlets for said mixing conduit, said inlets being of constant size regardless of suction to deliver a constant fuel mixture ratio whenever the temperature is at or above normal, means controlling one of said inlets to enrich the mixture when the temperature is below normal, said means comprising a valve constructed and arranged to be directly acted on by suction and to be moved by suction in a direction to lean out the mixture to normal proportions, means to limit the movement of the valve in that direction, and thereby determine the normal operating position of the valve, and heat responsive means to move the valve to its normal position independent of suction.

12. In a plain tube carburetor, means forming a mixing conduit, said conduit including a main air inlet, a main fuel inlet, and a mixture outlet, a manually operated valve for said conduit, a valve for controlling the flow through one of said inlets to enrich or lean out the fuel mixture discharged by said carburetor, a heat responsive device capable of operation independent of suction for operating said valve in accordance with the temperature to lean out the mixture upon an increase of temperature, and means for operating said valve to lean out said mixture upon an increase in suction in the carburetor, said last-named means including a suction conduit connected to a point in the mixing conduit posterior to said manually operated valve, said air and fuel inlets being of constant size regardless of suction during operation of the engine at normal temperature.

13. In a plain tube carburetor, means forming a mixing conduit, said conduit including a main air inlet, a main fuel inlet, and a mixture outlet, a manually operated throttle valve for said conduit, a valve for controlling the flow through one of said inlets to enrich or lean out the fuel mixture discharged by said carburetor, a heat responsive device for controlling said valve in accordance with the temperature to lean out the mixture upon an increase of temperature, said heat responsive device being constructed and arranged to operate said valve only when the temperature is below normal, and means for operating said valve to lean out said mixture upon an increase in suction in the carburetor, said last-named means including a suction conduit connected to a point in the mixing conduit posterior to said manually operated valve, and means for temporarily enriching the mixture delivered by said carburetor regardless of temperature.

14. In a carburetor, means forming a mixing conduit, said conduit including a main air inlet, a main fuel inlet, and a mixture outlet, a manually operated throttle valve for said conduit, an inlet valve for controlling the flow through one of said inlets to enrich or lean out the fuel mixture discharged by said carburetor, a heat responsive device for controlling said valve in accordance with the temperature to lean out the mixture upon an increase of temperature, said heat responsive device being constructed and arranged to operate said valve only when the temperature is below normal, and means for operating said valve to lean out said mixture upon an increase in suction in the carburetor, said last-named means including a suction conduit connected to a point in the mixing conduit posterior to said manually operated valve, and means for temporarily enriching the mixture delivered by said carburetor upon an opening movement of said throttle, regardless of the position of said inlet valve.

GEORGE R. ERICSON.

Disclaimer

Re. 22,742.—*George R. Ericson*, Kirkwood, Mo. CARBURETOR. Patent dated Apr. 9, 1946. Disclaimer filed Nov. 8, 1950, by the assignee, *Carter Carburetor Corporation.*

Hereby enters this disclaimer to claim 14 of said patent.

[*Official Gazette December 5, 1950.*]